United States Patent
Mazrolle et al.

(10) Patent No.: US 6,892,676 B2
(45) Date of Patent: May 17, 2005

(54) CANINE TRAINING BASE

(76) Inventors: James P. Mazrolle, P.O. Box 373, Goffstown, NH (US) 03045; Toby R. Mazrolle, P.O. Box 373, Goffstown, NH (US) 03045

( * ) Notice: Subject to any disclaimer, the term of this patent is extended or adjusted under 35 U.S.C. 154(b) by 0 days.

(21) Appl. No.: 10/676,599

(22) Filed: Oct. 1, 2003

(65) Prior Publication Data

US 2005/0072375 A1   Apr. 7, 2005

(51) Int. Cl.[7] ............................................. A01K 15/02
(52) U.S. Cl. ...................... 119/753; 119/703; 119/721; 482/147
(58) Field of Search ................. 119/753, 702, 703, 119/705, 712, 721, 722, 723; 482/142, 146, 482/147

(56) References Cited

U.S. PATENT DOCUMENTS

| | | | | |
|---|---|---|---|---|
| 72,674 A | * | 12/1867 | Perry et al. ................. | 119/753 |
| 583,661 A | * | 6/1897 | Smith ......................... | 119/700 |
| 1,426,082 A | * | 8/1922 | Jacobs et al. .................. | 472/4 |
| 1,533,261 A | * | 4/1925 | Pattison et al. ............. | 472/110 |
| 1,565,484 A | * | 12/1925 | McWhirter .................. | 482/146 |
| 2,707,465 A | * | 5/1955 | Nemeth ........................ | 601/87 |
| 3,352,559 A | * | 11/1967 | Larsen ........................ | 473/269 |
| 3,630,540 A | * | 12/1971 | Smith .................... | 280/87.042 |
| 4,601,469 A | * | 7/1986 | Sasser, Jr. ................... | 482/146 |
| 4,694,684 A | * | 9/1987 | Campbell, III ............. | 73/65.07 |
| 4,759,542 A | * | 7/1988 | Hudec .......................... | 482/34 |
| 4,817,950 A | * | 4/1989 | Goo ............................ | 273/148 |
| 5,203,279 A | * | 4/1993 | Eversdyk ..................... | 119/712 |
| 5,512,018 A | * | 4/1996 | Zimmers ..................... | 472/106 |
| 5,535,466 A | * | 7/1996 | Snell .............................. | 5/621 |
| 5,637,059 A | * | 6/1997 | Dalebout ...................... | 482/52 |
| 6,413,197 B2 | * | 7/2002 | McKechnie et al. ......... | 482/146 |
| 6,652,432 B2 | * | 11/2003 | Smith .......................... | 482/146 |
| 6,712,709 B1 | * | 3/2004 | Henderson et al. ......... | 472/106 |
| 2003/0017922 A1 | * | 1/2003 | Sachs .......................... | 482/146 |
| 2003/0057550 A1 | * | 3/2003 | Haukaas et al. ............ | 198/313 |

\* cited by examiner

*Primary Examiner*—Yvonne R. Abbott
(74) *Attorney, Agent, or Firm*—Hayes Soloway PC.

(57) ABSTRACT

A teeter-totter base for training canines may be coupled to the middle of an elongated plank. The base has a pair of legs that can be rotated in order to change the height of the plank off of a ground surface.

13 Claims, 5 Drawing Sheets

CANINE TRAINING BASE

FIELD OF THE INVENTION

The present invention relates to training equipment for canines and, more particularly, an adjustable base for a teeter-totter.

BACKGROUND OF THE INVENTION

Dog agility began as an exhibition sport in Great Britain and was imported into the United States in 1977. It was patterned after equestrian events and combines handler control, agility, and confidence. An agility ring is set up with a variety of obstacles. Obstacles include jumps, tunnels, a dog walk, a teeter-totter, an A-frame, and weave poles. The ring is generally square, about 100 feet×100 feet, and fenced off from the spectators. Dogs go through the ring on a leash with a handler (basic agility), or off leash with a guiding handler (advanced agility). They are judged by their ability to correctly negotiate the obstacles in a predetermined order. The dogs are judged primarily by the correctness by which they move on and off the obstacles and by which they stop and stay on command on other obstacles. The dogs are secondarily judged by their time in completing the obstacle course. This event requires significant training of both handler and dog.

The teeter-totter is an elongated plank that rotates about a pivot point located generally in the middle of the plank. In competition, the height of the pivot above the ground is based on the size of the dog. The plank is typically 8–14 inches wide and 10–14 feet in length. Contact zones, near each end of the plank, are typically 3–4 feet long. When a dog approaches the teeter-totter, one end of the plank, either the near end or the far end, is in contact with the ground. The dog must touch the near contact zone with at least one paw, traverse the plank, and then touch the far contact zone with at least one paw before proceeding to the next obstacle. As the dog traverse the obstacle, the plank rotates about the pivot point.

FIG. 1 is a side view of a plank 4 resting on a brick 6 in accordance with the prior art. Training of a dog 2 starts off by acquainting the dog 2 to a plank 4 resting on the ground. After the dog 2 masters touching the contact zones, the trainer may elevate the middle of the plank with a brick 6, as shown in FIG. 1, to a height "H". As the dog 2 gains more confidence, the trainer may stack additional bricks under the plank 4. A drawback to stacking bricks is that the bricks may topple while the dog 2 is traversing the obstacle and make the dog afraid of the obstacle.

Therefore, there is a need for a teeter-totter in which the pivot height of the plank can be quickly changed while still providing a secure structure.

BRIEF SUMMARY OF THE INVENTION

Embodiments of the present invention provide an adjustable height teeter-totter.

Briefly described, in architecture, one embodiment, among others, can be implemented as follows. A teeter-totter having an elongated plank coupled to a base, having first and second legs rotatably coupled to a bracket. The first leg and the second leg are rotatable from a first position to a second position such that the height of the plank from a ground surface is less when the first leg and the second leg are in the first position than when the first leg and the second leg are in the second position.

The present invention can also be viewed as providing a method of training a dog to traverse a teeter-totter. The method having the steps of: (1) placing a base secured to a bottom surface of an elongated plank in contact with a ground surface, the base allowing the elongated plank to rotate about the base; (2) allowing the dog to walk along the length of the plank with a center of the plank at a first height; (3) rotating a first leg coupled to the base until the first leg contacts a first stopper and rotating a second leg coupled to the base until the second leg contacts a second stopper; and (4) allowing the dog to walk along the length of the plank with the center of the plank at a second and greater height.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. Components in the drawings are not necessarily to scale, emphasis instead being placed upon clearly illustrating principles of the present invention. Moreover, in the drawings, like reference numerals designate corresponding parts throughout the several views.

DETAILED DESCRIPTION OF THE INVENTION

Figure 1:
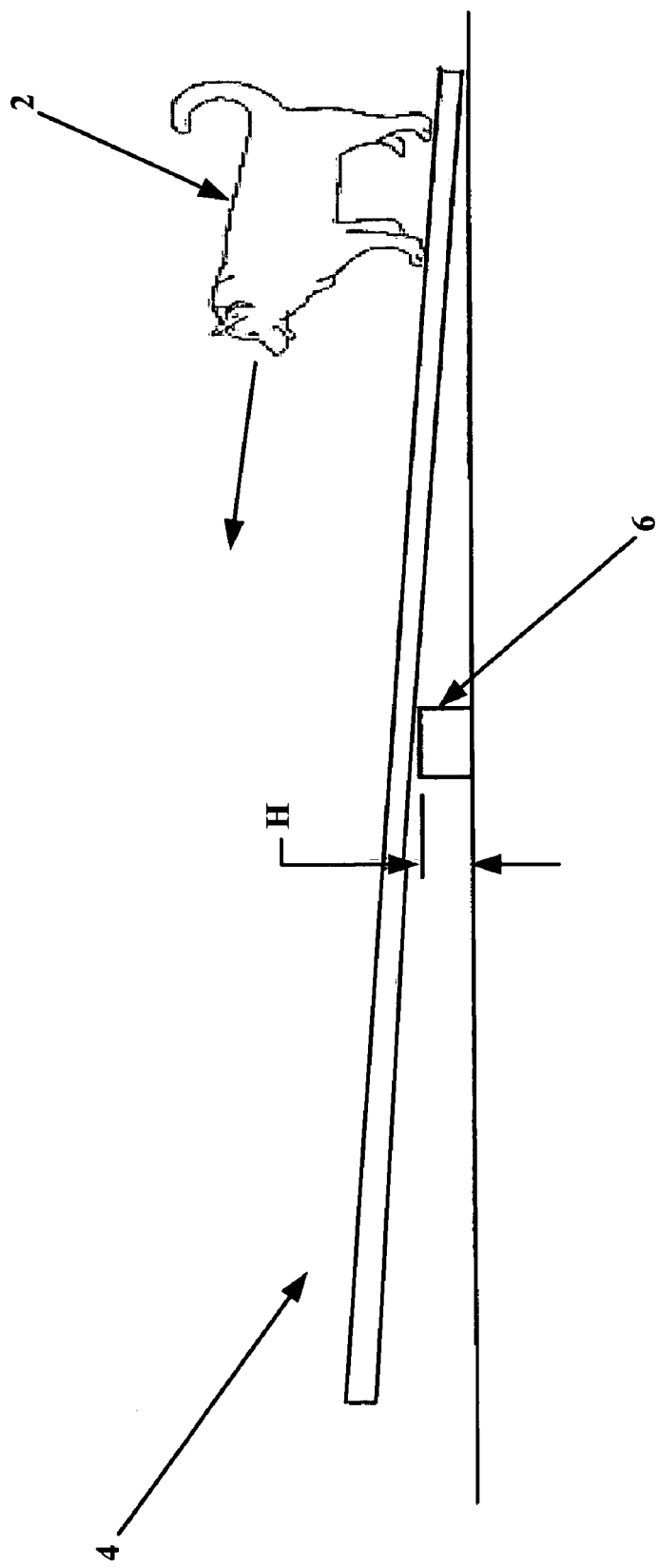
FIG. 1 is side view of a plank resting on a brick in accordance with the prior art.
Figure 2:
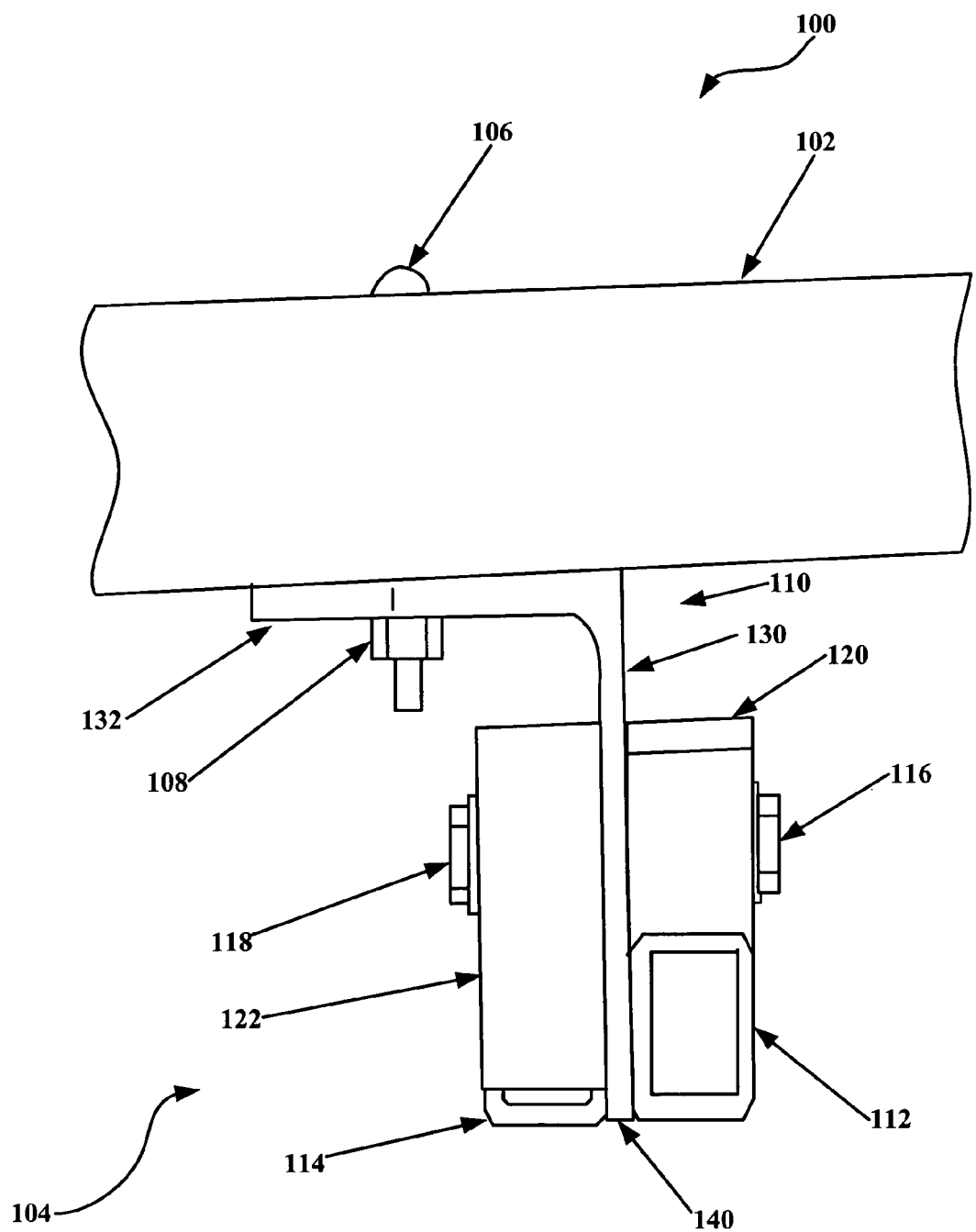
FIG. 2 is a side view of a teeter-totter in accordance with a first exemplary embodiment of the invention.

FIG. 2 is a side view of a teeter-totter 100 in accordance with a first exemplary embodiment of the invention. The teeter-totter 100 may include an elongated plank 102, for example a 2×12×12', coupled to a base 104. The base 104 may be in contact with, and coupled to, the middle of the plank 102 with a bolt 106 and cooperating nut 108 extending through an upper portion 132 of the base 104. Alternatively, the base 104 may be coupled to the plank 102 with any mechanical fastener, for example, a screw, without departing from the present invention.

Figure 3:
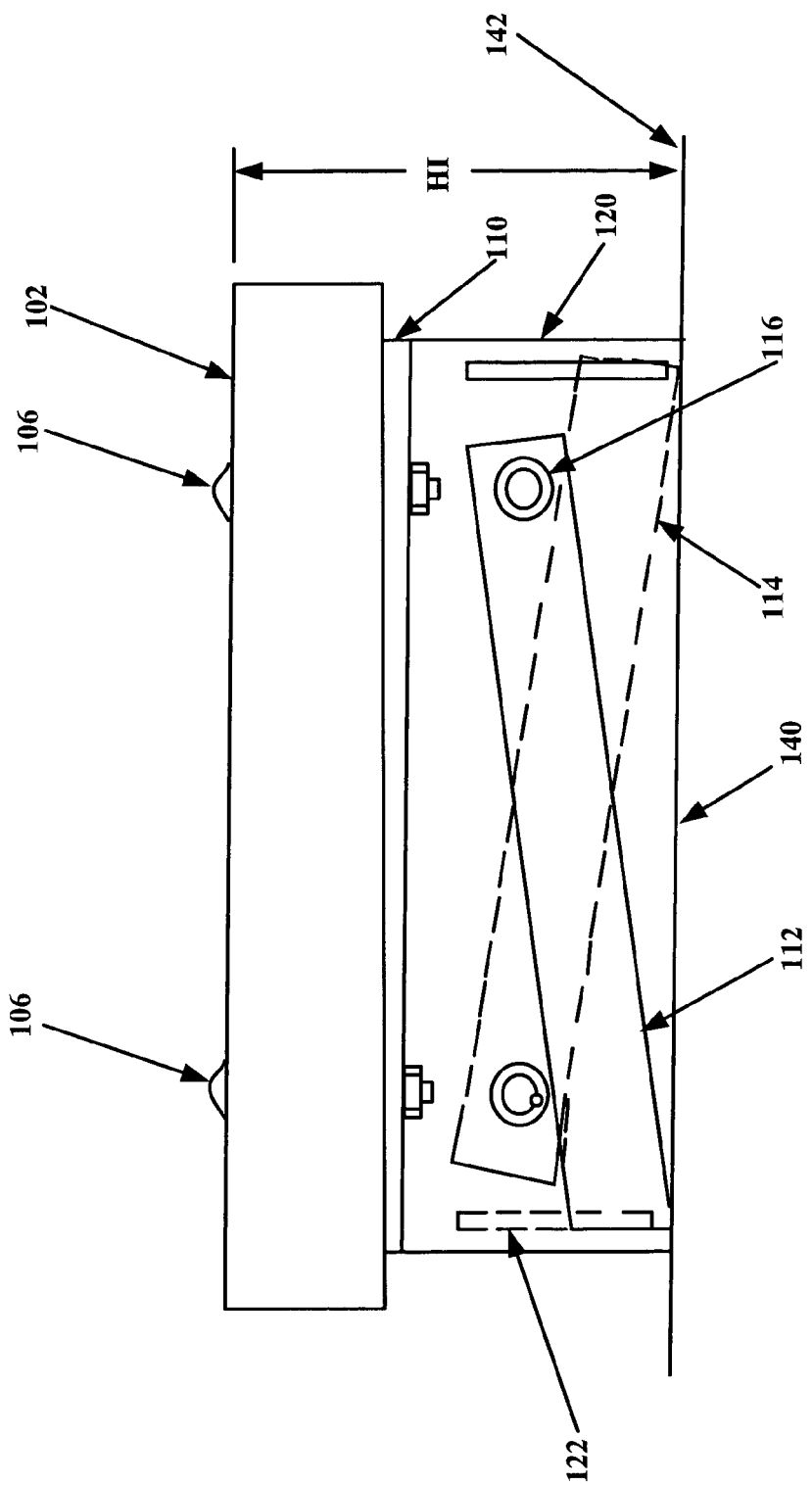
FIG. 3 is an end view of the teeter-totter of FIG. 2 in a "compact" position.
Figure 4:
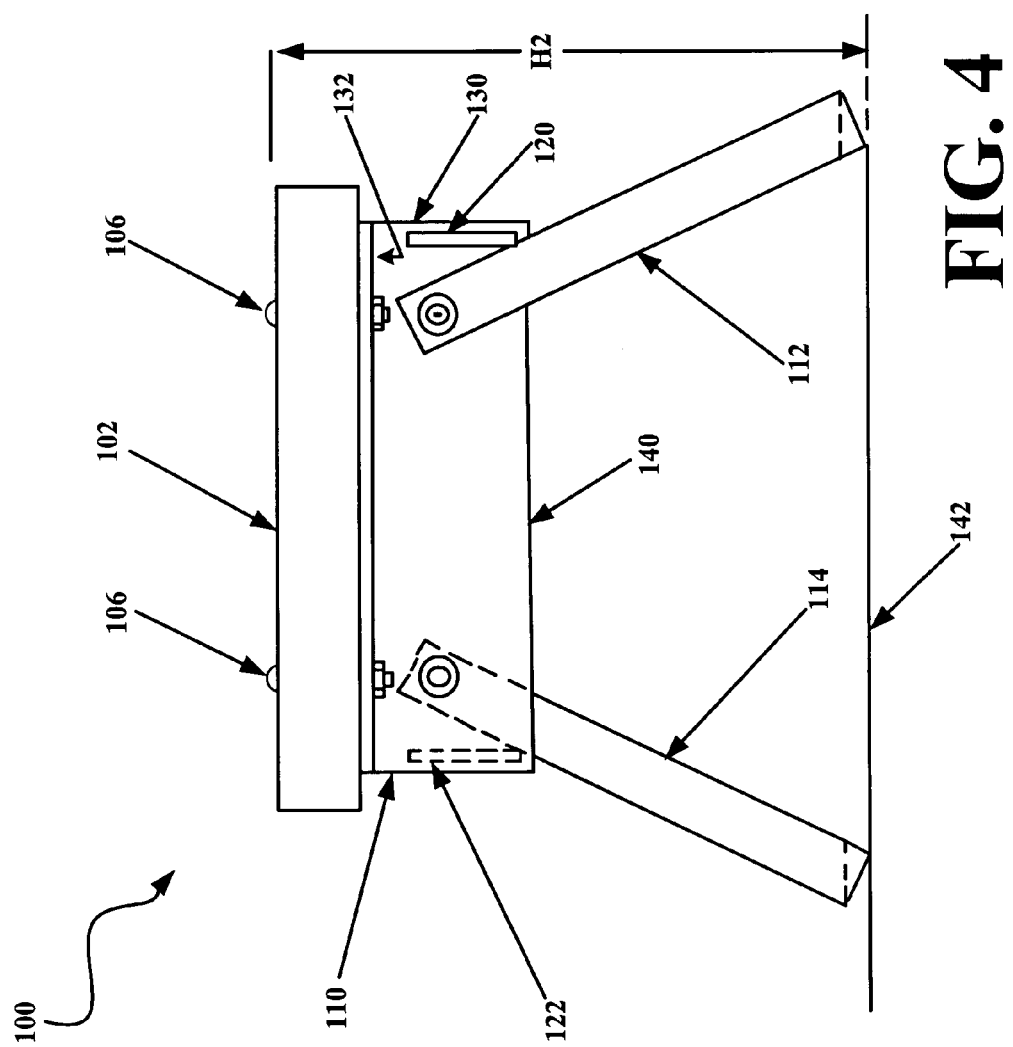
FIG. 4 is an end view of the teeter-totter of FIG. 2 in an "extended" position.

As shown in FIGS. 2–4, the base 104 may include an "L" bracket 110, a first leg 112, and a second leg 114. The "L" bracket 110 and the legs 112, 114 may be made from aluminum or other materials. The legs 112, 114 may be hollow tube stock or, alternatively, may be solid. The first leg 112 may be rotatably coupled to a lower portion 130 of the "L" bracket 110 with a first fastener 116, and the second leg 114 may be rotatably coupled to the lower portion 130 of the "L" bracket 110 with a second fastener 118. The first leg 112 may be disposed on a first side of the lower portion 130 and the second leg 114 may be disposed on a second side of the lower portion 130. Rotation of the first leg 112 may be restricted by a first stopper 120 and rotation of the second leg 114 may be restricted by a second stopper 122. The stoppers 120, 122 may be mechanically coupled to the "L" bracket 110, for example, by welding, soldering, or brazing. Alternatively, the stoppers may be pins inserted through the "L" bracket.

Alternatively, the legs 112, 114 may be hinged to the upper portion 132 of the "L" bracket 110; and the stopper may be mechanically coupled to the upper portion 132 without departing from the present invention.

Figure 5:
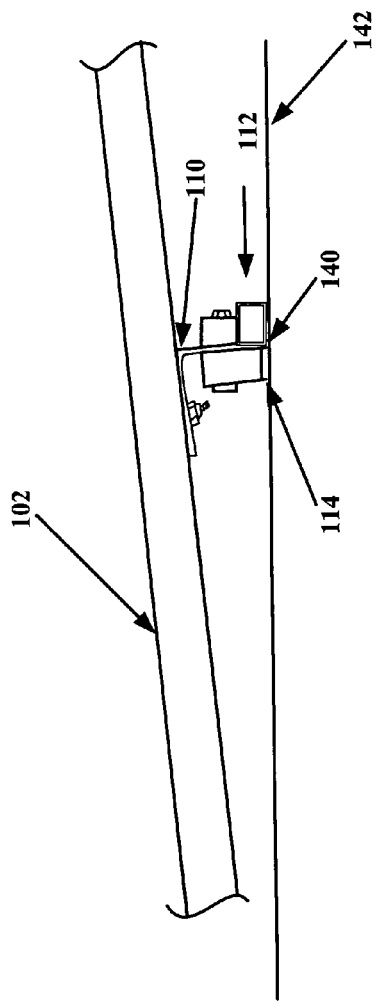
FIG. 5 is side view of the teeter-totter of FIG. 2 in a "compact" position.
Figure 6:
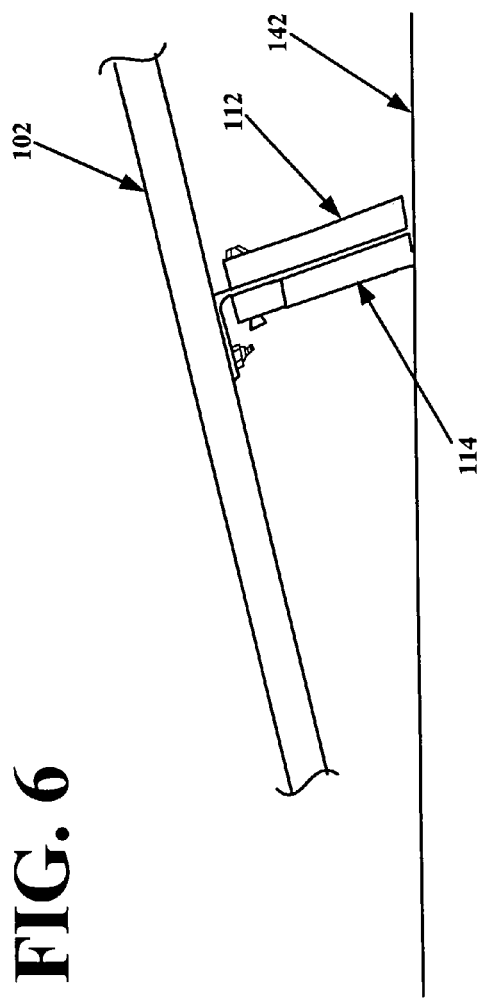
FIG. 6 is side view of the teeter-totter of FIG. 2 in an "extended" position.

FIGS. 3 and 5 show the teeter-totter 100 in a "compact" position, and FIGS. 4 and 6 show the teeter-totter in an "extended" position. In the "compact" position, an edge 140 contacts the ground 142 and the plank rotates about the edge 140. The edge 140 is spaced from the upper portion 132. To convert the teeter-totter 100 from the "compact" position to the "extended" position, the user rotates the legs 112, 114 until the legs 112, 114 contact the stoppers 120, 122 respectively. The height from the ground 142 to the top surface of the middle of the plank 102 in the "compact" position is H1, and the height from the ground 142 to the top surface of the middle of the plank 102 in the "extended" position is H2. In the "extended" position, the legs 112, 114 contact the ground 142 and the plank rotates about the legs 112, 114.

When a dog 2 approaches the teeter-totter 100, one end of the elongated plank 102, either the near end or the far end, is in contact with the ground. The dog 2 must touch the near contact zone with at least one paw, traverse the plank 102, and then touch the far contact zone with at least one paw before proceeding to the next obstacle. As the dog 2 traverses the teeter-totter 100, the plank 102 rotates about the edge 140 in the "compact" position and the legs 112, 114 in the "extended" position.

During training, the user starts off with the teeter-totter 100 in the "compact" position, i.e., the middle of the plank 102 is at a height H1 from the ground 142. After the dog 2 gains sufficient confidence, the user can rotate the legs 112, 114 into the "extended" position, i.e., the middle of the plank 102 is at a height H2 from the ground 142.

It should be understood that, while the present invention has been described in detail herein, the invention can be embodied otherwise without departing from the principles thereof; and such other embodiments are meant to come within the scope of the present invention as defined in the following claims.

We claim:

1. A teeter-totter, comprising:
an elongated plank; and
a base coupled to the plank, the base having a first leg and a second leg rotatably coupled to a bracket wherein the first leg and second leg rotate perpendicular to the rotation of the teeter-totter, the first leg and the second leg rotatable from a first position to a second position, the height of the plank from a ground surface being less when the first leg and the second leg are in the first position than when the first leg and the second leg are in the second position.

2. The teeter-totter of claim 1, wherein the bracket is an "L" bracket.

3. The teeter-totter of claim 2, wherein the first leg and the second leg are rotatably coupled to a lower portion of the "L" bracket.

4. The teeter-totter of claim 1, further comprising a first stopper to restrict travel of the first leg and a second stopper to restrict travel of the second leg.

5. The teeter-totter of claim 4, wherein the first stopper and the second stopper are welded to a lower portion of an "L" bracket.

6. The teeter-totter of claim 1, wherein the first leg and the second leg comprise hollow aluminum bar stock.

7. A canine training base, comprising:
a bracket having a first portion for contacting a plank rotatable about the bracket and a second portion having an edge spaced from the first portion;
a first leg having a distal end and a proximal end, the first leg being rotatably coupled to the bracket about a first pivot point located in proximity to the proximal end of the first leg wherein the first leg rotates perpendicular to the rotation of the plank; and
a second leg having a distal end and a proximal end, the second leg being rotatably coupled to the bracket about a second pivot point located in proximity to the proximal end of the second leg wherein the second leg rotates perpendicular to the rotation of the plank the first leg and the second leg being rotatable between a first position in which the edge of the bracket contacts a ground surface and a second position in which the distal ends of the first leg and the second leg contact the ground surface.

8. The canine training base of claim 7, wherein the first portion of the bracket and the second portion of the bracket form an "L" bracket.

9. The canine training base of claim 7, further comprising a first stopper to restrict travel of the first leg and a second stopper to restrict travel of the second leg.

10. The canine training base of claim 9, wherein the first stopper and the second stopper are welded to the second portion of the bracket.

11. The canine training base of claim 7, wherein the first leg and the second leg are rotatably coupled to the second portion of the bracket.

12. The canine training base of claim 7, wherein the first leg and the second leg comprise hollow aluminum bar stock.

13. A method of training a dog to walk across a teeter-totter, comprising the steps of:
placing a base secured to a bottom surface of an elongated plank in contact with a ground surface, the base allowing the elongated plank to rotate about the base;
allowing the dog to walk along the length of the plank with a center of the plank at a first height;
rotating a first leg coupled to the base until the first leg contacts a first stopper and rotating a second leg coupled to the base until the second leg contacts a second stopper; and
allowing the dog to walk along the length of the plank with the center of the plank at a second and greater height.

* * * * *